June 24, 1958 W. LEARMONTH ET AL 2,840,262
CLOSURE SEAL
Filed July 6, 1954
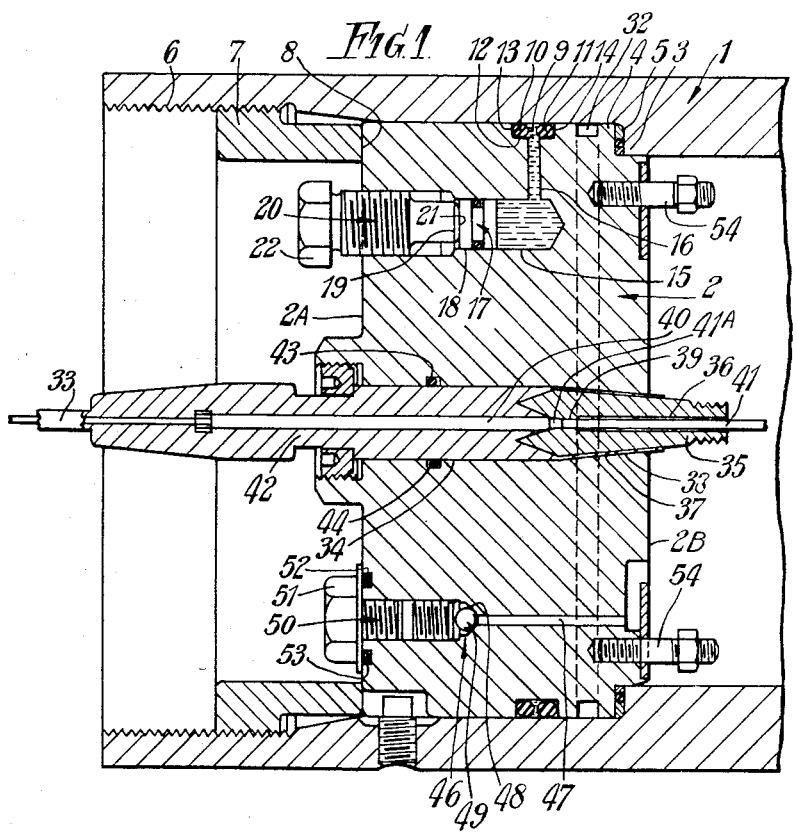
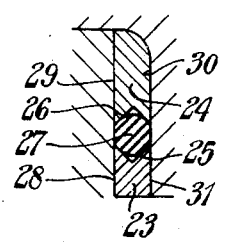
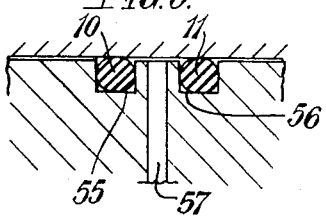
Inventors
William Learmonth
Bryan Cooke
By Pennie, Edmonds, Morton, Barrows & Taylor
Attorneys

2,840,262

CLOSURE SEAL

William Learmonth and Bryan Cooke, London, England, assignors to Vickers-Armstrongs Limited, London, England, a British company Application July 6, 1954, Serial No. 441,613

Claims priority, application Great Britain July 6, 1953

5 Claims. (Cl. 220—46)

This invention relates to sealing devices.

According to the present invention there is provided a sealing device for preventing leakage of a first fluid between two co-operating faces, wherein two parallel strips of readily deformable material are each laid along an associated groove formed in one of the faces, the strips extending in a direction transverse to that in which leakage is to be prevented, and each pressing against the opposite face and at least one of the walls of its associated groove, there being at least one passageway through which a second fluid can be forced into the grooves, and means permitting sealing of the passageway to maintain pressure on the second fluid.

For a better understanding of the invention and the method of carrying the same into effect, reference will now be made to the accompanying drawing, in which:

Figure 1 is a cross-sectional view of a bulkhead closing one end of an elongated housing for a submerged repeater, Figure 2 is an enlarged sectional view of a detail of the apparatus of Figure 1, and Figure 3 is an alternative form of a sealing device for use with the bulkhead of Figure 1.

The housing has an elongated cylindrical shell 1 each end of which is closed by a bulkhead. Only one end of the shell is shown in Figure 1, the other end being closed by an identical bulkhead arrangement. Each end portion of the shell has an internal shoulder 3 and the associated bulkhead, which is in the form of a thick circular plate 2, has a corresponding shoulder 4 that co-operates with the shoulder 3 in the shell 1, there being a sealing ring 5 that includes deformable metallic material, located between the two shoulders. Each extremity of the shell is threaded interiorly as at 6 and an externally threaded ring 7 is screwed into the threaded extremity of the shell to abut against the periphery 8 of the outside surface of the plate 2. The ring 7 is tightened so that the sealing ring 5 is tightly gripped between the two shoulders 3, 4. A shallow circumferential groove 9 is formed around the plate 2 and two toroidal seals 10, 11 are located side-by-side in this groove. Each seal 10, 11 consists of a circular sectioned ring of rubber or other easily deformable material. The ring 10 abuts against the shell 1, the bottom 12 of the groove and the side wall 13 of the groove 9 and the ring 11 abuts against the shell 1, the bottom 12 of the groove and the opposite side wall 14 of the groove. A plurality of longitudinally extending cylinders 15 are formed within the plate 2, each such cylinder 15 communicating with the groove 9 via a radially directed passageway 16 which extends from the cylinder 15 to the centre of the bottom 12 of the groove. Each cylinder 15 contains a piston 17 that has at least one piston ring 18 for preventing leakage past the periphery of the piston. The piston ring 18 is preferably a circular sectioned ring of rubber. The end 19 of a longitudinally extending bolt 20 abuts against that end 21 of the piston 17 that is nearest the outer face 2A of the bulkhead. The heads 22 of the bolts 20 stand outwardly of the outer face 2A of the bulkhead. The cylinders 15, the passageways 16 and the groove 9 are filled with grease and the bolts 20 are tightened whereby grease is forced into the groove 9 and causes the toroidal seals 10, 11 to be forced hard against the three faces that they abut against. The bolts 20 are tightened to such an extent that the pressure on the grease is greater than the pressure to which the housing 1 will be subjected when submerged. To this end the bolts 20 are screwed down using a torque registering spanner until a predetermined torque is indicated, previous calibration tests having shown the torque required to obtain the desired pressure on the grease.

The sealing ring 5 located between the two shoulders 3, 4 is a ring as set forth in our British Patent Specification No. 656,032. The sealing ring 5 (Figure 2) essentially consists of an inner guard ring 23 of copper, an outer guard ring 24 of copper, the inner ring 23 having a V-groove 25 in its outer surface and the outer ring 24 having a V-groove 26 in its inner surface and there being a toroidal ring 27 of rubber located between the two copper rings 23, 24. Before the sealing ring 5 is gripped between the two shoulders 3, 4, the rubber ring 27 stands outwardly of the radial faces 28—31 of the copper rings 23, 24. When gripped between the two shoulders 3, 4, the rubber ring 27 is deformed and is forced into the V-grooves 25, 26 and fills the latter. An intimate metal-to-metal contact is formed between the plate 2 of the bulkhead and the copper rings 23, 24 and also between the shoulder 3 on the shell 1 and the copper rings 23, 24.

A further annular groove 32 is formed circumferentially around the periphery of the plate 2, this groove 32 being located between said shallow groove 9 and the sealing ring 5. The groove 32 forms a space in which any water vapour diffusing past the shallow groove 9 can collect and condense. During tests the diffusion rate of water vapour past the pressurised gland comprising the two toroidal seals 10, 11 and grease under pressure can be measured. The volume of the condensing space formed by the groove 32 is such that for a given period of time all the water vapour diffusing past the pressurised gland will be condensed. Thus the pressure between the pressurised gland and the sealing ring 5, at the interface between the plate 2 and the shell 1 will not, during this period of time, rise above the vapour pressure of the condensed water.

Electrical equipment (not shown) for amplifying telegraph signals is located within the housing 1 and it is therefore necessary for one or more electric cables to pass into and out of the housing 1. In the embodiment shown a cable passes in through the centre of one bulkhead and out through the centre of the other bulkhead. A single insulated conductor cable 33 is all that is required to pass through each bulkhead. Each plate 2 has an axially directed aperture 34 therethrough, the aperture being cylindrical for approximately two-thirds of its length as measured from the outer face 2A of the bulkhead and converging slightly towards the inner face 2B for the remainder of its length. A copper sheathed ceramic plug 35 having a central bore 36 is pressed into the aperture 34 and a tight metal-to-metal contact is formed between the copper sheath 37 and the metal wall 38 forming the convergent portion of the aperture 34. The bore 36 of the plug 35 is restricted at the end of the plug that is remote from the inner face 2B of the bulkhead (i. e. as at 39). A copper conductor 40 which at the end 41 thereof is narrower than the restricted part 39 of the bore 36 of the plug 35 is passed through the plug, the narrower end being inserted into the outer end of the plug 35. The conductor 40 has a shoulder 41A thereon where the diameter of the conductor increases to a diameter greater than that of the restricted part 39 of the bore 36 of the plug 35. On the smaller diameter of the conductor 40 just ahead of the shoulder 41A are bands of solder (not shown) or other relatively easily deformable metallic material. The conductor 40 is threaded through the bore 36 until it projects from the low pressure end of the plug 35 and the projecting portion is pulled so that the bands of solder are drawn into the restricted part 39 of the plug 35 and the shoulder 41A on the conductor 40 encounters the ceramic material. The ceramic plug 35 is protected from water on the high pressure side thereof by a "polythene" plug 42 which surrounds the conductor. The polythene plug 42 is a tight fit in the aperture 34. An annular groove 43 is formed in the bore of the aperture 34 and a toroidal ring 44 of rubber is located in this groove 43 to form a safety seal as between the polythene plug 42 and the material forming the surface of the aperture 34.

It is desirable that the space in which the electrical equipment (not shown) is located within the housing 1 should initially be filled with a dry and inert gas such as nitrogen. A screw down non-return valve 46 is therefore formed in each plate 2. Each valve 46 comprises a passageway 47 which extends longitudinally from the inner face 2B of the bulkhead towards the outer face 2A. The passageway is enlarged at a point 48 to form a seating for a ball 49. A bolt 50 screwed into the passageway 47 from the high pressure or outer side 2A of the bulkhead, forces the ball 49 onto the seating at 48. The head 51 of the bolt 50 abuts against the outer face 2A of the bulkhead and a rubber sealing ring 52 is located in a groove 53 beneath the bolt head 51.

The inner (i. e. the low pressure) face 2B of the bulkhead has a plurality of studs 54 projecting therefrom for permitting connection between the electrical equipment (not shown) and the housing 1.

It will be understood that the pressurised gland formed by the groove 9 and the rings 10, 11 is not limited to the employment of toroidal seals. Seals other than toroidal seals may be used such, as for example, square-sectioned rings, V-rings, U-rings. Furthermore, in a modified construction (Figure 3), the two seals 10, 11 are fitted in separate grooves 55, 56 into which grease under pressure is forced via a passageway 57.

The piston 17 and the piston ring 18 could be replaced by a bolt 20 of which the end 19 is further extended longitudinally to form a plunger. In this case a seal would be fitted in a groove in the cylinder wall to act as a fluid gland. Alternatively, the seal 18 could be housed in a groove round the periphery of the bolt.

It will also be understood that the pressure can be applied to the grease by means other than that described above. For example, pressure may be applied by means of a grease gun or pump, in which case a nonreturn valve would be employed in the plate 2, in conjunction with each of the cylinders 15.

We claim:

1. In a fluid-tight submersible communications-line repeater housing for containing electrical equipment to be connected to a communications cable, the repeater housing being adapted to withstand external pressures when submerged and including an elongated cylindrical shell having a cylindrical bore, a circular-sectioned plate-like bulkhead releasably mechanically secured in the bore of the cylindrical shell at each end of the elongated cylindrical shell, each bulkhead having a peripheral cylindrical surface facing the inner surface of the cylindrical bore, said cylindrical surface being provided with at least one annular groove open toward the inner surface of the cylindrical bore, a sealing means for preventing leakage of an external fluid past the periphery of the bulkhead, said sealing means comprising two spaced parallel annular strips of readily deformable material each laid in an annular groove in the cylindrical surface of the bulkhead, the bulkhead being provided with at least one passageway for supplying a pressure fluid between said spaced strips to the inner surface of the bore of the shell at the location of the strips, means in the bulkhead for forcing said pressure fluid along the passageway and into contact with said strips and for maintaining a pressure on the pressure fluid in excess of that of the external fluid, the cross-sectional dimensions of the strips being such that the pressure applied by the forcing means to the pressure fluid forces each strip against that side wall of the groove in which it is laid that is remote from the other strip and also against the inner surface of the bore of the shell and the bottom of the groove in which it is laid.

2. A fluid-tight housing for electrical equipment as claimed in claim 1, in which said strips are located in the same groove at the respective sides thereof and in which said passageway opens into the groove at a location between said strips.

3. In a fluid-tight submersible communications-line repeater housing for containing electrical equipment to be connected to a communications cable, the repeater housing being adapted to withstand external pressures when submerged and including an elongated cylindrical shell having a cylindrical bore, a circular-sectioned plate-like bulkhead releasably mechanically secured in the bore of the cylindrical shell at each end of the elongated cylindrical shell, each bulkhead having a peripheral cylindrical surface facing the inner surface of the cylindrical bore, said cylindrical surface of the bulkhead being provided with two parallel annular grooves open toward the inner surface of the cylindrical bore and separated by a band, a sealing means for preventing leakage of an external fluid past the periphery of the bulkhead, said sealing means comprising two parallel annular strips of readily deformable material laid respectively in said annular grooves in the cylindrical surface of the bulkhead, the bulkhead being provided with at least one passageway for supplying a pressure fluid between said strips to the inner surface of the bore of the shell at a location between the strips, and means in the bulkhead for forcing said pressure fluid along the passageway and into contact with said strips and for maintaining a pressure on the pressure fluid in excess of that of the external fluid, the cross-sectional dimensions of the strips being such that the pressure applied by the forcing means to the pressure fluid forces each strip against that side wall of the groove in which it is laid that is remote from the other groove and strip and also against the inner surface of the bore of the shell and the bottom of the groove in which it is laid.

4. In a fluid-tight submersible communications-line repeater housing for containing electrical equipment to be connected to a communications cable, the repeater housing being adapted to withstand external pressure when submerged and including an elongated cylindrical shell, at least one end portion of which is provided with a cylindrical bore terminating in an annular shoulder inwardly from said end, a circular-sectioned plate-like bulkhead releasably mechanically secured in said cylindrical bore, the peripheral portion of the inner side of the bulkhead being forced towards said shoulder, a sealing ring including deformable metallic material located between said shoulder and said inner side of the bulkhead, means in said end portion of the housing bearing against the outer face of the bulkhead for forcing the bulkhead toward said shoulder to grip the sealing ring, the bulkhead having a peripheral cylindrical surface facing the inner surface of the cylindrical bore, said cylindrical surface of the bulkhead being provided with at least one annular groove open toward the inner surface of the cylindrical bore, a sealing means for preventing leakage of an external fluid past the periphery of the bulkhead, said sealing means comprising two spaced parallel annular strips of readily deformable material each laid in an annular groove in the cylindrical surface of the bulkhead, the bulkhead being provided with at least one passageway for supplying a pressure fluid between said strips to the inner surface of the bore of the shell at the location of the strips, and means in the bulkhead for forcing said pressure fluid along the passageway and into contact with said strips and for maintaining a pressure on the pressure fluid in excess of that of the external fluid, the cross-sectional dimensions of the strips being such that the pressure applied by the forcing means to the pressure fluid forces each strip against that side wall of the groove in which it is laid that is remote from the other strip and also against the inner surface of the bore of the shell and the bottom of the groove in which it is laid, said sealing ring including the deformable metallic material thereof being subject to compression by the pressure of the external fluid.

5. In a fluid-tight submersible communications-line repeater housing for containing electrical equipment to be connected to a communications cable, the repeater housing being adapted to withstand external pressures when submerged and including an elongated cylindrical shell having a cylindrical bore, a circular-sectioned plate-like bulkhead releasably mechanically secured in the bore of the cylindrical shell, the bulkhead having inner and outer faces and a peripheral cylindrical surface facing the inner surface of the cylindrical bore, said cylindrical surface of the bulkhead being provided with at least one annular groove open toward the inner surface of the cylindrical bore, a sealing means for preventing leakage of an external fluid past the periphery of the bulkhead into the housing, said sealing means comprising two spaced parallel annular strips of readily deformable material each laid in an annular groove in the cylindrical surface of the bulkhead, the bulkhead being provided with at least one passageway for supplying a pressure fluid between said strips to the inner surface of the bore of the shell at the location of the strips, a portion of said passageway comprising a cylinder opening through the outer face of the bulkhead, a piston in said cylinder, and means carried by the bulkhead and acting on said piston to force said pressure fluid along the passageway and into contact with said strips and for maintaining a pressure on the pressure fluid in excess of that of the external fluid, the cross-sectional dimensions of the strips being such that the pressure applied by the forcing means to the pressure fluid forces each strip against that side wall of the groove in which it is laid that is remote from the other strip and also against the inner surface of the bore of the shell and the bottom of the groove in which it is laid.

References Cited in the file of this patent

UNITED STATES PATENTS

| | | |
|---|---|---|
| 658,588 | Reynolds et al. | Sept. 25, 1900 |
| 1,151,614 | Putnam | Aug. 31, 1915 |
| 1,635,482 | Joyce | July 12, 1927 |
| 1,732,235 | Joyce | Oct. 22, 1929 |
| 1,800,085 | Kroeger et al. | Apr. 7, 1931 |
| 2,114,381 | Horner | Apr. 19, 1938 |
| 2,348,293 | Hamer | May 9, 1944 |
| 2,371,633 | Lippincott | Mar. 20, 1945 |
| 2,421,847 | Pfleumer | June 10, 1947 |
| 2,476,074 | Unger | July 12, 1949 |
| 2,504,936 | Payne | Apr. 18, 1950 |

FOREIGN PATENTS

| | | |
|---|---|---|
| 32,584 | Norway | June 27, 1921 |